(12) United States Patent
Swinderman

(10) Patent No.: US 6,374,990 B1
(45) Date of Patent: Apr. 23, 2002

(54) CONVEYOR BELT CLEANER SCRAPER BLADE WITH SENSOR

(75) Inventor: R. Todd Swinderman, Kewanee, IL (US)

(73) Assignee: Martin Engineering Company, Neponset, IL (US)

(*) Notice: Subject to any disclaimer, the term of this patent is extended or adjusted under 35 U.S.C. 154(b) by 0 days.

(21) Appl. No.: 09/454,856

(22) Filed: Dec. 7, 1999

Related U.S. Application Data

(60) Provisional application No. 60/111,774, filed on Dec. 10, 1998.

(51) Int. Cl.[7] .............................................. B65G 45/10
(52) U.S. Cl. .................. 198/497; 198/499; 198/502.1
(58) Field of Search .................. 198/497, 499, 198/502.1

(56) References Cited

U.S. PATENT DOCUMENTS

| | | | | |
|---|---|---|---|---|
| 4,182,444 A | * | 1/1980 | Fisher | .................. 198/499 |
| 4,465,362 A | | 8/1984 | Tohma et al. | |
| 4,501,486 A | | 2/1985 | Landa | |
| 4,598,823 A | | 7/1986 | Swinderman | |
| 4,643,293 A | | 2/1987 | Swinderman | |
| 4,768,645 A | * | 9/1988 | Farris | .................. 198/499 |
| 4,819,026 A | | 4/1989 | Lange | |
| 4,927,003 A | * | 5/1990 | Swinderman et al. | ........ 198/497 |
| 5,088,965 A | | 2/1992 | Swinderman et al. | |
| 5,278,620 A | | 1/1994 | Godlove | |
| 5,426,485 A | | 6/1995 | Fujita et al. | |
| 5,622,249 A | * | 4/1997 | Morin | .................. 198/499 |
| 5,838,245 A | | 11/1998 | Murakami et al. | |
| 5,845,763 A | | 12/1998 | Van Tilburg | |
| 6,076,656 A | * | 6/2000 | Mat | .......................... 198/499 |

FOREIGN PATENT DOCUMENTS

| | | |
|---|---|---|
| EP | 0 787 669 | 8/1997 |
| JP | 60106710 | 12/1985 |

* cited by examiner

*Primary Examiner*—Christopher P. Ellis
*Assistant Examiner*—Rashmi Sharma
(74) *Attorney, Agent, or Firm*—Lee, Mann, Smith, McWilliams, Sweeney & Ohlson

(57) ABSTRACT

A conveyor belt cleaner scraper blade for cleaning the surface of a conveyor belt. The scraper blade includes a base member adapted to be attached to a cross shaft of a conveyor belt cleaner and a wear section which extends outwardly from the base member to a scraping tip. The wear section includes a plurality of temperature sensors located along the length of the wear section, a plurality of wear sensors located along the length of the wear section, and one or more strain gage sensors located along the length of the wear section. Each of the sensors is in electrical communication with an electrical transmitter member that is adapted to provide an electrical output signal to a computer. The temperature sensors provide an indication of the temperature of the wear section at the location of each temperature sensor. The wear rate sensors provide an indication of the location of the scraping tip with respect to the base member as the wear section wears away and the tip moves closer to the base member. The strain gage sensors provide an indication of the magnitude of the strain the wear section is subjected to during scraping engagement with the conveyor belt.

22 Claims, 1 Drawing Sheet

CONVEYOR BELT CLEANER SCRAPER BLADE WITH SENSOR

RELATED APPLICATIONS

This application claims the benefit of U.S. Provisional Application No. 60/111,774, filed Dec. 10, 1998.

BACKGROUND OF THE INVENTION

The present invention is directed to a conveyor belt cleaner scraper blade for scraping adherent bulk material from a conveyor belt, and in particular to a conveyor belt cleaner scraper blade including one or more sensors for monitoring the operating conditions of the scraper blade.

Some conveyor mechanisms utilize a moving conveyor belt to transport sand, gravel, coal and other bulk materials, from one location to another. As the bulk material is discharged from the conveyor belt, a portion of the bulk material often remains adhered to the belt. Conveyor belt cleaners, including one or more scraper blades, are used to scrape the adherent material from the belt and thereby clean the belt. A primary conveyor belt cleaner may be placed in scraping engagement with the conveyor belt at the head pulley of the conveyor and a secondary conveyor belt cleaner may be placed in scraping engagement with and below the return run of the conveyor belt a short distance behind the primary conveyor belt cleaner. The scraper blades of a conveyor belt cleaner are removably attached to a rotatable or linearly adjustable cross shaft that extends transversely across the width of the conveyor belt. A tensioning device is attached to one or both ends of the cross shaft. The tensioning device applies a rotational or linear biasing force to the cross shaft which in turn moves the scraper blades into scraping engagement with the conveyor belt with a desired amount of force. During operation, the scraping edge of each scraper blade wears due to its scraping engagement with the rotating conveyor belt. The tensioner rotates or linearly adjusts the cross shaft and the scraper blades to maintain the scraper blades in biased scraping engagement with the conveyor belt.

In order to obtain optimum performance from the scraper blades of a conveyor belt cleaner, it is preferable that the scraper blades be biased into scraping engagement with the conveyor belt with a predetermined amount of force. If the scraper blades are biased against the conveyor belt with an excessive amount of force, this will result in excessive wear to the scraper blades, potential damage to the conveyor belt, and may cause the tip of the scraper blade to develop an excessively high temperature due to the friction generated between the scraper blade and the rotating conveyor belt. If the scraper blades are biased against the conveyor belt with too small of a force, the scraper blades may not effectively clean the conveyor belt. In addition, the scraping tip of the scraper blades may vibrate or chatter against the conveyor belt depending upon the amount of force with which the scraper blades are biased into engagement with the conveyor belt, thereby potentially damaging the scraper blades and/or the belt, and decreasing cleaning efficiency. It is therefore useful to monitor the conditions and parameters of a scraper blade during operation, such as the scraping tip temperature, the rate of wear of the scraper blade, and the magnitude of the force with which the scraper blade is biased into scraping engagement with the conveyor belt, to optimize the performance of the scraper blade. All of these parameters are subject to change depending on a number of factors including conveyor belt speed and the type of material being conveyed.

SUMMARY OF THE INVENTION

A conveyor belt cleaner scraper blade for cleaning the surface of a conveyor belt. The scraper blade includes a base member adapted to be attached to the cross shaft of a conveyor belt cleaner and a wear section that extends outwardly from the base member to a scraping tip which is adapted to engage the conveyor belt. The wear section of the scraper blade includes a plurality of temperature sensors that are located along the length of the wear section between the base member and the tip. The wear section may also include a plurality of first wear sensors and a plurality of second wear sensors spaced laterally apart from the first wear sensors. The first and second wear sensors are also located along the length of the wear section between the base member and the tip. The wear section may also include one or more strain gage sensors located along the length of the wear section between the base member and the tip. All of the sensors are in electrical communication with an electrical transmitter member in the base member which may be a cable port, an infrared signal port, a radio signal port, or other well known apparatus for collecting and transmitting electronic information. The cable port is adapted to be removably attached to an electrical cable and thereby to a computer. Each of the sensors may also be electrically connected to a microprocessor which is in electrical communication with the electrical transmitter member. Each temperature sensor provides an indication of the temperature of the wear section at the particular location of the temperature sensor. The strain gage sensors provide an indication of the magnitude of the strain the wear section is subjected to during scraping engagement with the conveyor belt. The wear rate sensors provide an indication of the location of the tip with respect to the base member as the wear section wears away due to its scraping engagement with the rotating conveyor belt and as the tip moves closer to the base member. Ultimately, the information which is sensed by the sensors and fed to the microprocessor may be utilized to vary the operating conditions of the conveyor belt including the speed of the belt, the tension applied by a conveyor belt cleaner tensioner, or possibly sounding an alarm or other signal.

BRIEF DESCRIPTION OF THE DRAWING FIGURES

DETAILED DESCRIPTION OF THE PREFERRED EMBODIMENTS

Figure 1:
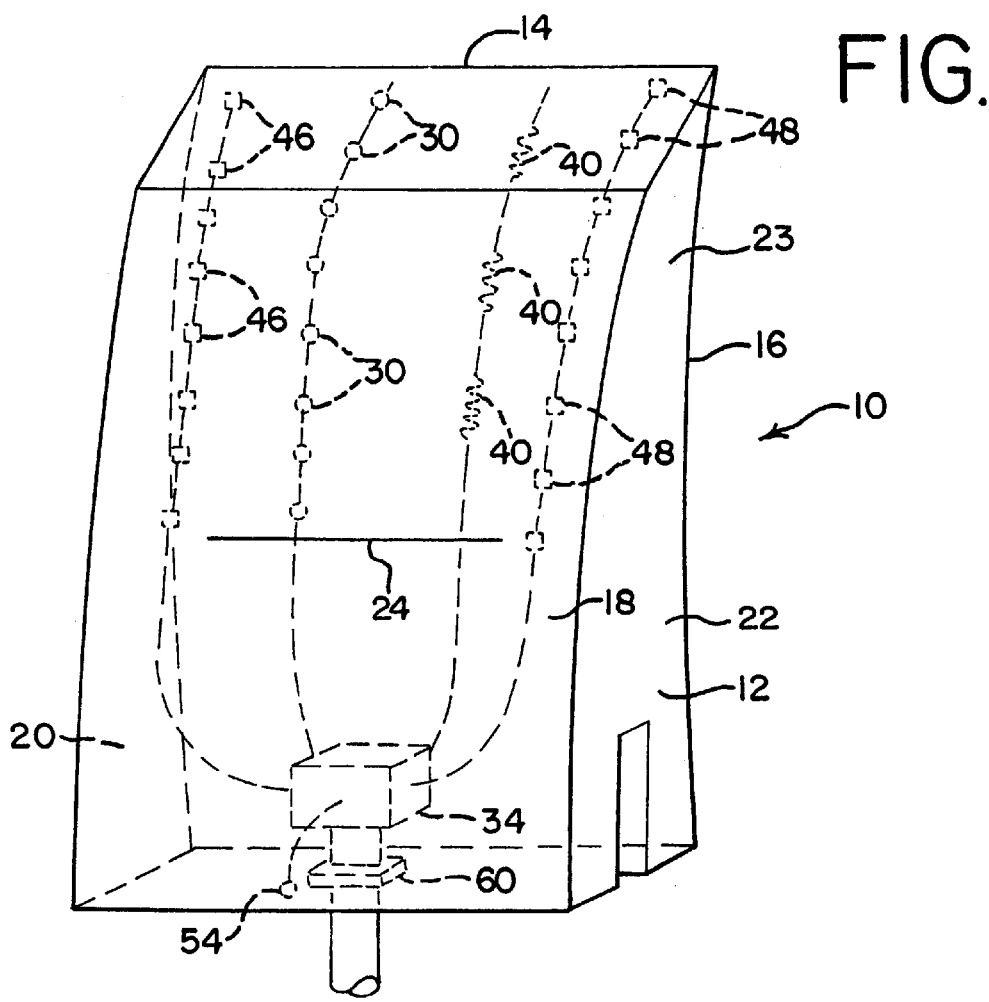
FIG. 1 is a perspective view of a primary scraper blade according to the present invention that is adapted for use in connection with a primary conveyor belt cleaner.

The primary conveyor belt cleaner scraper blade 10 of the present invention, as shown in FIG. 1, is adapted to be removably attached to a cross shaft (not shown) of a conveyor belt cleaner for engagement with the belt proximate the head pulley such as disclosed in U.S. Pat. No. 4,598,821 of Martin Engineering Company, which is incorporated herein by reference. One or more scraper blades 10 may be attached to the cross shaft. A tensioning device (not shown), such as disclosed in U.S. Pat. No. 5,088,965 of Martin Engineering Company, which is incorporated herein by reference, is attached to the end of the cross shaft and is adapted to provide selective conjoint movement (either rotational or linear) of the cross shaft and of the scraper blades 10 to move each scraper blade 10 into biased scraping engagement with the conveyor belt with a scraping force.

The scraper blade 10 includes a base member 12 that is adapted to be removably attached to the cross shaft in any of a number of ways known to one of ordinary skill in the art and a scraping tip 14 that is adapted to engage the conveyor belt. The scraper blade 10 also includes an inner surface 16 that extends from a first bottom edge of the base 12 to the tip 14 and an outer surface 18 that extends from a second bottom edge of the base 12 to the tip 14. The inner and outer surfaces 16 and 18 extend between a first side wall 20 and a second side wall 22. The inner and outer surfaces 16 and 18 may each include one or more curved and/or planar surface portions. The scraper blade 10 includes a wear section 23 that extends between the inner surface 16 and the outer surface 18 and that extends from the base 12 to the tip 14. The wear section 23 of the conveyor belt scraper blade 10 is adapted to wear during use such that the scraping tip 14 as shown in FIG. 1 is eventually located approximately at the bottom end of the wear section 23. A wear line 24 is located on the outer surface 18 adjacent the bottom end of the wear section 23. When the scraping tip 14 of the worn scraper blade 10 is located approximately at the wear line 24, such that the wear section 23 is substantially worn away, the scraper blade 10 should be replaced. The scraper blade 10 is preferably formed from an elastomeric material such as urethane or rubber.

As shown in FIG. 1, the scraper blade 10 includes one or more electrical temperature sensors 30 that are embedded within the wear section 23 of the scraper blade 10, or that are attached to the outer surface 18 of the scraper blade 10. One type of temperature sensor that may be used is Model LM 335 from National Semiconductors. The temperature sensors 30 are located along the length of the wear section 23 from the scraping tip 14 to approximately the wear line 24. Each temperature sensor 30 is electrically connected to a microprocessor 34 which L3 may be located in the base 12 as illustrated in FIG. 1, or located elsewhere, and electrically connected to the sensor. One type of microprocessor that may be used is Model 68 HC 11 microcontroller from Motorola. The microprocessor 34 may include a battery to operate the microprocessor 34 and data storage means for collecting and storing data. The temperature sensors 30 are adapted to measure the temperature of the scraper blade 10 at locations located along the length of the wear section 23, including the scraping tip 14 of the scraper blade 10. Each temperature sensor 30 transmits an electrical signal corresponding to the temperature measured by it to the microprocessor 34. The temperature sensors 30 may comprise thermocouples.

The scraper blade 10 also includes one or more electrical strain detection sensors 40 such as strain gage sensors. The strain detection sensors 40 may be embedded within the wear section 23, or attached to the outer surface 18 of the scraper blade 10. The strain detection sensors 40 are located along the length of the wear section 23 from the tip 14 of the scraper blade 10 to approximately the wear line 24. As the scraper blade 10 is preferably made of an elastomeric material such as urethane or rubber, the wear section 23 of the scraper blade 10 will resiliently flex between the base 12 and the tip 14 in response to the magnitude of the scraping force with which the tip 14 is pressed against the conveyor belt. The strain detection sensors 40 measure the strain of the scraper blade 10 due to the flexure of the scraper blade 10, which corresponds to the magnitude of the scraping force with which the scraper blade 10 is biased against the conveyor belt. The strain detection sensors 40 thereby provide a measurement that corresponds to the magnitude of the scraping force with which the scraper blade 10 engages the conveyor belt. Each strain detection sensor 40 sends an electrical signal corresponding to the measured strain and the corresponding scraping force to the microprocessor 34.

The scraper blade 10 also includes one or more first electrical wear rate sensors 46 and one or more second electrical wear rate sensors 48. The first and second wear rate sensors 46 and 48 are respectively located along the length of the wear section 23 from the tip 14 to the wear line 24 of the scraper blade 10. As shown in FIG. 1, the first wear rate sensors 46 extend along the left edge of the scraper blade 10 and the second wear rate sensors 48 extend along the right edge of the scraper blade 10. The first wear rate sensors 46 and the second wear rate sensors 48 are electrically connected to the microprocessor 34. The wear rate sensors 46 and 48 measure the current location of the scraping tip 14 with respect to a known location on the scraper blade 10, such as the bottom end of the wear section 23 at the wear line 24, as the end of the scraper blade 10 wears during use. Each first and second wear rate sensor 46 and 48 respectively sends an electrical signal to the microprocessor 34 which signals indicate the current position of the scraping tip 14 with respect to the bottom end of the wear section 23 or the top of the base member 12. As the outermost wear rate sensors 46 and 48 are worn away, a signal is no longer received from these sensors thereby indicating that the scraping tip 14 has worn past their location and indicating that the scraping tip 14 is presently located adjacent the outermost wear rate sensors 46 and 48 that are still sending signals to the microprocessor 34. Each wear rate sensor 46 and 48 may be combined with a respective temperature sensor 30 as a single combined sensor. A thermocouple may be used as a combined sensor to indicate both temperature and wear rate.

The scraper blade 10 also includes an ambient air temperature sensor 54 located in the outer surface 18, near the bottom wall of the base 12 of the scraper blade 10, that is adapted to be placed in communication with the surrounding air. The ambient air temperature sensor 54 measures the ambient temperature of the air in the area adjacent to the scraper blade 10. The ambient air temperature sensor 54 is electrically connected to the microprocessor 34 and sends an electrical signal to the microprocessor 34 that corresponds to the measured ambient air temperature. The ambient air temperature measured by the ambient air temperature sensor 54 can be compared to the scraping tip temperature measured by the temperature sensors 30 to determine the temperature differential therebetween, which corresponds to the increase in temperature of the scraping tip 14. The increase in temperature of the scraping tip 14 may be attributable to the friction created between the scraping tip 14 of the scraper blade 10 and the rotating conveyor belt, and/or to the transfer of heat from hot bulk material carried by the conveyor belt to the scraper blade 10.

The microprocessor 34 is electrically connected to an electrical transmitter member 60, such as an electrical connector member, located in the base 12. The electrical transmitter member 60 may be an RS232 serial port or other type of port such as an infrared port or a radio signal port. The electrical transmitter member 60 may be adapted to be attached to a cable that is connected to a computer. The transmitter member 60 transfers data collected by the microprocessor 34 and the sensors to the computer for storage and analysis.

Alternatively, the scraper blade 10 may not include the microprocessor 34, and each of the sensors 30, 40, 46, 48 and 54 may be electrically connected directly to the electrical transmitter member 60, such that the transmitter member 60 will transfer the respective signals generated by the sensors 30, 40, 46, 48 and 54 to a microprocessor located outside of the scraper blade 10 or directly to a computer.

Figure 2:
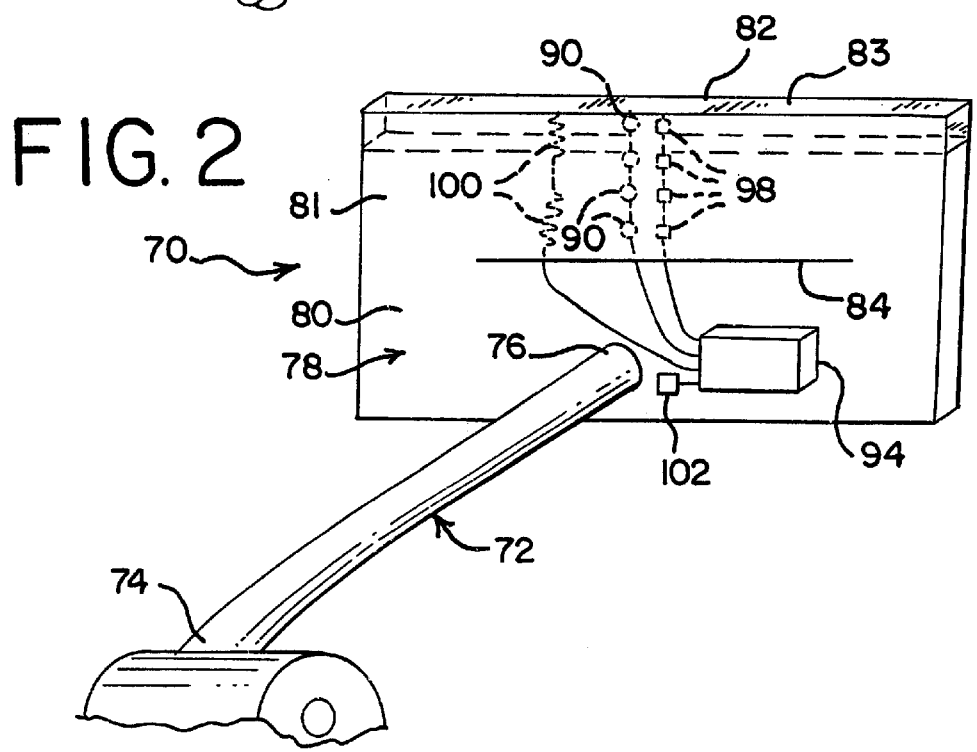
FIG. 2 is a perspective view of a secondary scraper blade according to the present invention that is adapted for use in connection with a secondary conveyor belt cleaner.

Another embodiment of the conveyor belt cleaner scraper blade of the present invention is shown in FIG. 2 and is designated with reference number 70. The scraper blade 70 is adapted for use in connection with a secondary conveyor belt cleaner, such as described in U.S. Pat. No. 4,643,293 of martin Engineering Company, which is incorporated herein by reference. The scraper blade 70 includes an arm 72 having a first end 74 that is adapted to be connected to the cross shaft of the conveyor belt cleaner and a second end 76 that is adapted to be connected to a blade 78. The arm 72 and the blade 78 may be respectively formed from an elastomeric material such as urethane or rubber, or may respectively be made of a metal or ceramic material. The blade 78 includes a base member 80 and a wear section 81 having a scraping tip 82. The wear section 81 may include a wear resistant insert 83, formed from a metal such as tungsten carbide, that is connected to the end of the blade 78 to form the scraping tip 82.

The wear section 81 of the scraper blade 70 includes one or more temperature sensors 90 that are located along the length of the wear section 81 from the scraping tip 82 to a wear line 84 located adjacent to the bottom end of the wear section 81. The temperature sensors 90 are electrically connected to a microprocessor 94. The microprocessor 94 may be embedded within the blade 78 or may be adhesively bonded or otherwise attached to an exterior surface of the blade 78 or may be disposed at a remote location. The microprocessor 94 preferably includes one or more batteries for powering the microprocessor 94 and data storage means for collecting and storing data. Each temperature sensor 90 measures the temperature of the wear section 81 of the scraper blade 70 at its respective location, including at the scraping tip 82, and transmits an electrical signal corresponding thereto to the microprocessor 94.

The wear section 81 of the scraper blade 70 also includes one or more wear rate sensors 98 that are electrically connected to the microprocessor 94. The wear rate sensors 98 are located along the length of the wear section 81 from the scraping tip 82 to approximately the wear line 84. The wear rate sensors 98 indicate or measure the location of the scraping tip 82 relative to the bottom end of the wear section 81 at the wear line 84 as the scraping tip 82 wears down through use. Each wear rate sensor 98 transmits an electrical signal to the microprocessor 94 that is used to indicate the current location of the scraping tip 82. Each temperature sensor 90 may also be combined with a respective wear rate sensor 98 as a combined sensor that indicates both temperature and wear rate. Such a combined sensor may comprise a thermocouple.

The scraper blade 70 may also include one or more strain detection sensors 100, such as strain gage sensors, for sensing the amount of strain the blade 78 is subjected to during operation which corresponds to the scraping force with which the blade 78 engages the conveyor belt. Each strain gage sensor 100 transmits an electrical signal corresponding to the magnitude of the measured strain to the microprocessor 94.

The scraper blade 70 includes an electrical transmitter member 102 that is electrically connected to the microprocessor 94. The transmitter member 102 is adapted to be electrically connected to a cable and thereby to a computer. Alternatively, the microprocessor 94 may be eliminated from the scraper blade 70 and the sensors 90, 98 and 100 may be directly connected to the transmitter member 102.

The sensors of the scraper blades 10 and 70 are constructed so as to not wear or groove the conveyor belt. The temperature sensors 30 and 90 measure blade tip temperature, which can indicate whether the conveyor belt is running with or without material, or when the scraper blade is biased into scraping engagement with the conveyor belt with a larger or smaller than desired force. The strain detection sensors 40 and 100 measure strain and large amplitude vibrations or chatter at the scraping tip 14 and 82 of the scraper blades 10 and 70 to indicate the number of hours the scraper blades have been in operation and/or scraper blade chatter. The strain detection sensors 40 and 100 measure and indicate impact forces applied to the scraper blades 10 and 70 which in turn indicates the condition of the surface of the conveyor belt. The strain detection sensors 40 and 100 also indicate the bending or flexural strain in the scraper blades 10 and 70 which corresponds to the force with which the scraper blades are biased into engagement with the conveyor belt. The wear sensors 48 and 98 indicate the remaining useable scraping length of the wear sections 23 and 81 of the scraper blades 10 and 70 and the rate of wear of the wear sections.

The interval at which the microprocessors 34 and 94 acquire data from the sensors may be varied as desired from an interval such as sixty seconds for purposes of research and development to an interval of approximately five minutes for service uses. The data storage capacity of the microprocessors 34 and 94 may also vary, such as from ninety days of data storage capability for research and development purposes to a data storage capability of one year for service operations. The microprocessors may store all of the data collected by the sensors for review and analysis at a later date or may be connected to the conveyor drive mechanism and/or tensioning mechanism to automatically vary the speed of the conveyor belt or the tension applied to the scraper blades when the sensed data varies from predetermined ranges. Alternatively, the microprocessor may be connected to sound an alarm or activate some other signal when certain conditions are sensed. Also the sensors may be connected to display devices such as gauges or digital readout devices to display the conditions being sensed.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A conveyor belt cleaner scraper blade for cleaning the surface of a conveyor belt, said scraper blade including:
   a base member;
   a wear section extending outwardly from said base member, said wear section including a tip adapted to engage the conveyor belt;
   one or more electrical sensors coupled to said scraper blade, each said electrical sensor adapted to sense a physical condition present at said scraper blade, wherein said one or more electrical sensors are embedded within said scraper blade.

2. The conveyor belt cleaner scraper blade of claim 1 wherein said electrical transmitter member comprises an electrical connector member, each said sensor being in electrical communication with said electrical connector member, said electrical connector member adapted to be attached to an electrical cable.

3. The conveyor belt cleaner scraper blade of claim 1 including a microprocessor in electrical communication with said one or more electrical sensors.

4. The conveyor belt cleaner scraper blade of claim 1 including a plurality of electrical sensors spaced apart from one another along the length of said wear section between said base member and said tip.

5. The conveyor belt cleaner scraper blade of claim 1 wherein said electrical sensors include one or more temperature sensors adapted to sense the temperature of said scraper blade adjacent each said temperature sensor.

6. The conveyor belt cleaner scraper blade of claim 5 wherein each said temperature sensor comprises a thermocouple.

7. The conveyor belt cleaner scraper blade of claim 1 wherein said electrical sensors include one or more strain detection sensors, each said strain detection sensor being adapted to provide an indication of the magnitude of the strain said wear section is subjected to during scraping engagement with the conveyor belt.

8. The conveyor belt cleaner scraper blade of claim 7 wherein said strain detection sensors comprise strain gage sensors.

9. The conveyor belt cleaner scraper blade of claim 1 wherein said electrical sensors include one or more first wear sensors, said first wear sensors adapted to provide an indication of the location of said tip with respect to said base member which location changes as said wear section wears away and said tip moves closer to said base member.

10. The conveyor belt cleaner scraper blade of claim 9 wherein said electrical sensors include one or more second wear sensors, said second wear sensors being laterally spaced apart from said first wear sensors, said second wear sensors adapted to provide an indication of the location of said tip with respect to said base member as said wear section wears away and said tip moves closer to said base member.

11. The conveyor belt cleaner scraper blade of claim 1 wherein said one or more electrical sensors include an ambient air temperature sensor adapted to sense the temperature of the air adjacent said scraper blade.

12. The conveyor belt cleaner scraper blade of claim 1 wherein said wear section is formed from an elastomeric material and said electrical sensors are embedded in said elastomeric material.

13. The conveyor belt cleaner scraper blade of claim 1 including an electrical transmitter associated with said electrical sensors adapted to receive a signal from said sensors and transmit said signal to a receiver.

14. The conveyor belt cleaner scraper blade of claim 1 wherein said one or more electrical sensors are located at said wear section.

15. The conveyor belt cleaner scraper blade of claim 1 wherein said one or more electrical sensors are located at said base member.

16. A conveyor belt cleaner scraper blade for cleaning the surface of a conveyor belt, said scraper blade including:
   a base member;
   a wear section extending outwardly from said base member, said wear section including a tip adapted to engage the conveyor belt; and
   a plurality of sensors associated with said scraper blade, each said sensor adapted to sense a physical condition present at said scraper blade, wherein said sensors are spaced apart from one another along the length of said wear section between said base member and said tip.

17. A conveyor belt cleaner scraper blade for cleaning the surface of a conveyor belt, said scraper blade including:
   a base member;
   a wear section extending outwardly from said base member, said wear section including a tip adapted to engage the conveyor belt; and
   a temperature sensor embedded within said scraper blade, said temperature sensor adapted to sense the temperature of said scraper blade.

18. A conveyor belt cleaner scraper blade for cleaning the surface of a conveyor belt, said scraper blade including:
   a base member;
   a wear section extending outwardly from said base member, said wear section including a tip adapted to engage the conveyor belt; and
   a strain detection sensor associated with said scraper blade, said strain detection sensor adapted to provide an indication of the magnitude of the strain said wear section is subjected to during engagement with the conveyor belt.

19. A conveyor belt cleaner scraper blade for cleaning the surface of a conveyor belt, said scraper blade including:
   a base member;
   a wear section extending outwardly from said base member, said wear section including a tip adapted to engage the conveyor belt; and
   one or more first wear sensors associated with said scraper blade, said first wear sensors adapted to provide an indication of the location of a first portion said tip with respect to said base member which location changes as said wear section wears away and said tip moves closer to said base member.

20. The conveyor belt scraper blade of claim 19 including one or more second wear sensors, said second wear sensors being laterally spaced apart from said first wear sensors, said second wear sensors adapted to provide an indication of the location a second portion of said tip with respect to said base member as said wear section wears away and said tip moves closer to said base member such that said first and second wear sensors detect wear at different locations across said wear section.

21. A conveyor belt cleaner scraper blade for cleaning the surface of a conveyor belt, said scraper blade including:
   a base member;
   a wear section extending outwardly from said base member, said wear section including a tip adapted to engage the conveyor belt; and
   an ambient air temperate sensor associated with said scraper blade, said ambient air temperature sensor adapted to sense the temperature of the air adjacent said scraper blade.

22. A conveyor belt cleaner scraper blade for cleaning the surface of a conveyor belt, said scraper blade including:
   a base member;
   a wear section extending outwardly from said base member, said wear section including a tip adapted to engage the conveyor belt; and
   one or more sensors associated with said scraper blade, each said sensor adapted to sense a physical condition present at said scraper blade, wherein said one or more sensors are located at said wear section.

* * * * *